United States Patent [19]

Matusz

[11] 4,292,857

[45] Oct. 6, 1981

[54] CYLINDRICAL GEAR WITH HELICAL TOOTH WHEELS

[75] Inventor: Zbigniew Matusz, Warsaw, Poland

[73] Assignee: Fabryka Obrabiarek Precyzyjnych "Ponar-Pruszkow" Zaklad "i Maja", Pruszkow, Poland

[21] Appl. No.: 946,207

[22] Filed: Sep. 25, 1978

[30] Foreign Application Priority Data

Sep. 29, 1977 [PL] Poland ................................. 201125

[51] Int. Cl.³ .............................................. F16H 55/08
[52] U.S. Cl. ........................................ 74/466; 74/409
[58] Field of Search .......................... 74/460, 466, 462

[56] References Cited

U.S. PATENT DOCUMENTS 1,772,688  8/1930  Roano .................................... 74/466

Primary Examiner—C. J. Husar
Assistant Examiner—Conrad Berman
Attorney, Agent, or Firm—Haseltine and Lake

[57] ABSTRACT

A cylindrical gear train comprising first and second gears having helical teeth of different thickness with different pitch diameters for the left hand and right hand sides of the teeth and with different nominal angles of inclination and different mesh correction for the mating left hand and right hand flanks of the teeth. Within the normal module range of $m_n = 2-6$ mm, corresponding to the normal module range of $2\pi$(mm) to $6\pi$(mm), and for pitch diameters up to 500 mm, the maximum tooth convergency is 3° and the addendum modification coefficient does not exceed 0.8.

3 Claims, 2 Drawing Figures $\beta_{OL}$ - nominal rake of the left side of teeth $\beta_{OP}$ - nominal rake of the right side of teeth

CYLINDRICAL GEAR WITH HELICAL TOOTH WHEELS

FIELD OF THE INVENTION

This invention relates to gear trains adapted for application of cylindrical gears having helical teeth of variable thickness permitting adjustment of the backlash or operation of the gear train with no play whatsoever.

The invention is applicable to the machine-building industry.

PRIOR ART

The conventional gear design contemplates a gear train with convergent straight bevel-cylindrical gears. The tooth thickness variation results from convergence of the tooth flanks, the average angle of inclination of the tooth profile being 0 deg.

The gear train operation is similar to that of a straight cylindrical gear.

This design has the shortcoming of quite difficult reproduction of the tooth line and profile because of the very small tooth line inclination angle (usually less than 1 deg.), and also the low ratio of tooth contact causing reduced strength and noisy operation of the gear train.

Another known playless gear train design consists in combination of two gear pairs, in which for one direction of rotation forces are transmitted via the tooth flanks of one pair, and via the tooth flanks of the other pair for the opposite direction by rotation. The design has the disadvantages of excessively extended construction and large overall dimensions, the necessity of using two pairs of tooth wheels, as well as higher costs of production.

SUMMARY OF THE INVENTION

The invention seeks to obviate the above disadvantages by increasing the tooth contact ratio and better execution of the train while having its overall dimensions kept small and using only one pair of tooth wheels, along with its better strength and quite operation.

This objective is achieved with cylindrical helical gears having different pitch diameters for the L.H. and R.H. sides of the teeth, different angles of inclination and other mesh correction on mating L.H. and R.H. teeth flanks wherein the intermating tooth flanks have compatible angles of tooth line inclination.

For the normal module range of 2 to 6 mm, corresponding to the normal pitch range of $2\pi$(mm) through $6\pi$(mm), and pitch diameters up to 500 mm, the tooth line convergence is up to 3 deg., the addendum modification coefficient value not exceeding 0.8.

DETAILED DESCRIPTION

Figure 1:
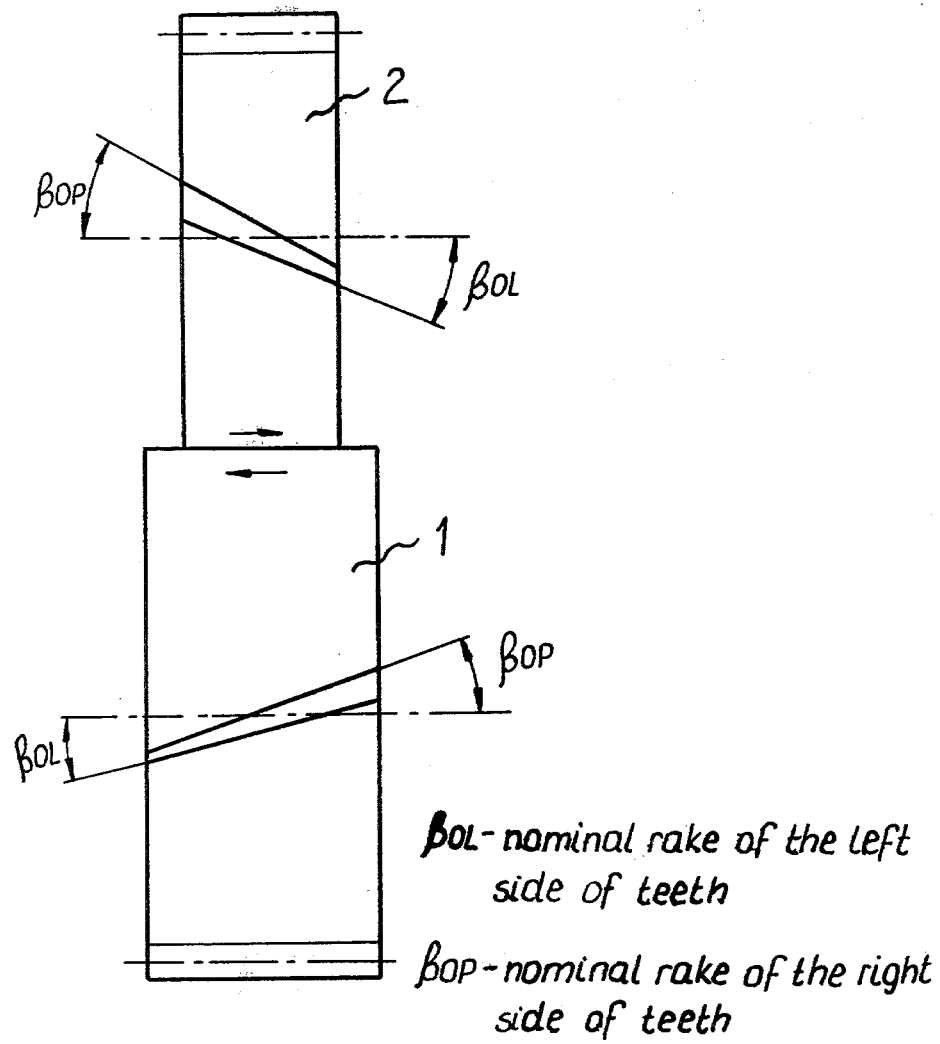
FIG. 1 is a plan view showing two mating gears of a gear train.

Shown in the drawing are mating gear wheels 1 and 2 of a gear train. The left hand side of a tooth of gear 1 has a pitch diameter $d_pL_1$ and the right hand side a pitch diameter $d_pP_1$ while the left hand side of a tooth of gear 2 has a pitch diameter $d_pL_2$ and the right hand side a pitch diameter $d_pP_2$. According to the invention, the mating gear wheels have different pitch diameters for the R.H. and L.H. sides of the teeth ($d_pL_1$ as compared to $d_pP_1$ for gear 1 and $d_pL_2$ as compared to $d_pP_2$ for gear 2), as well as different nominal angles of the tooth line inclination ($\beta_{OL}$ as compared to $\beta_{OP}$ for each gear). The intermating tooth flanks have compatible angles of the tooth line inclination, as well as compatible profile angles.

Mating tooth profiles are conjugate.

The pitch play adjustment can be effected by mutual axial shifting the gear wheels 1 and 2 with respect to one another.

The greater the angular difference between the R.H. and L.H. sides of the teeth, the smaller the axial shift required to change the play. This adjustment is of infinitely variable type.

By exertion of elastic pressure in the axial direction between the mating tooth wheels 1 and 2, a permanent operation of the transmission with no play can be obtained.

With increased mean angle of the helix inclination, the tooth contact ratio value increases.

The gear designed with adjustable play or for operation with no play whatsoever, based on application of helical tooth wheels, allows increase of the total contact ratio value, compared to that available with straight tooth wheels, through the so called pitch contact ratio, whereby better and smoother operation of the gear train can be attained, along with higher strength of the gear teeth.

Figure 2:
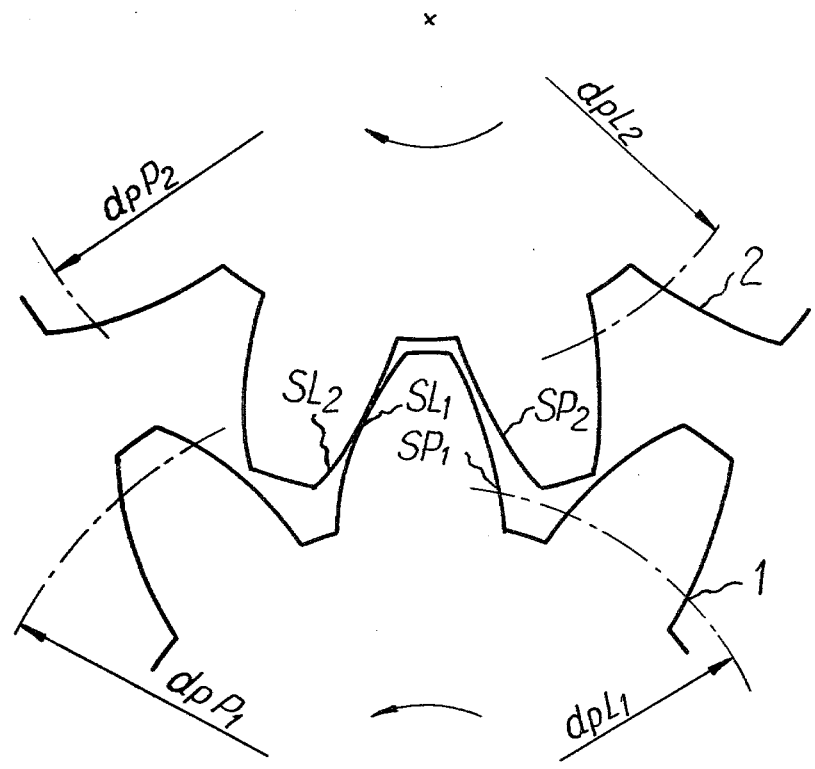
FIG. 2 is an elevational view of a portion of the mating gears in FIG. 1.

As may be seen in FIG. 2, the L.H. side of the tooth $SL_1$ of the gear 1 having a tooth nominal inclination angle $\beta_{OL}$ comes into mesh with the L.H. side $SL_2$ of a tooth of gear 2 whose nominal angle of inclination also is $\beta_{OL}$. This angle value is different from that for the R.H. side $\beta_{OP}$ of the tooth flanks for a direction of rotation which is reversed as compared with that shown by the arrows in the drawing.

The mesh correction for the R.H. and L.H. sides of the teeth is of the so called P-type. In this regard, an addendum modification coefficient is multiplied by the tooth pitch value to obtain an addendum modification value. The addendum modification coefficient for one side of conjugate teeth has a positive value but a negative value for the other side; therefore, the L.H. side profile is different from that of the R.H. side of teeth.

The invention features the following most essential technical and economical properties:
possibility for adjusting the pitch play, or for effecting gear train operation with no play whatever;
higher strength and service life;
smooth and uniform running;
small overall dimensions fo the train;
two gears only, contrary to the fours as indispensable in some known designs;
reduced costs of production.

The gear train design according to this invention, with a view to its application to machines and equipment requiring a drive transmission having adjustable pitch play or operated with no play whatever, the properties of cylindrical helical gears being preserved, can be a source of substantial economic and quality effects.

I claim:

1. A gear train comprising first and second cylindrical gears having helical teeth, each tooth having left hand and right hand sides with respective different pitch diameters, the teeth of the first and second gears having different nominal angles of inclination and different mesh correction for the left hand and right hand mating flanks of conjugate teeth whereby within the normal module range of 2 to 6 mm, corresponding to the normal pitch range of 2π(mm) to 6π(mm), and pitch diameters up to 500 mm, tooth convergencies up to 3° are provided, the addendum modification coefficient value not exceeding 0.8.

2. A gear train as claimed in claim 1 wherein said gears have different thickness.

3. A gear train as claimed in claim 2 wherein the addendum modification coefficient for one side of the tooth is positive and for the other side of the tooth is negative.

* * * * *